(12) United States Patent
Mizuno

(10) Patent No.: US 8,259,951 B2
(45) Date of Patent: Sep. 4, 2012

(54) METHOD AND SYSTEM FOR MANAGING ENCRYPTION KEY

(75) Inventor: Yoichi Mizuno, Yokohama (JP)

(73) Assignees: Hitachi, Ltd., Tokyo (JP); Hitachi Computer Peripherals Co., Ltd., Kanagawa-ken (JP)

( * ) Notice: Subject to any disclaimer, the term of this patent is extended or adjusted under 35 U.S.C. 154(b) by 1191 days.

(21) Appl. No.: 12/078,517

(22) Filed: Apr. 1, 2008

(65) Prior Publication Data

US 2009/0202080 A1    Aug. 13, 2009

(30) Foreign Application Priority Data

Feb. 12, 2008   (JP) ................. 2008-030451

(51) Int. Cl.
*H04L 9/08*    (2006.01)

(52) U.S. Cl. .......... 380/279; 380/278; 380/45; 713/168; 713/194; 726/26; 726/2

(58) Field of Classification Search ........................ None
See application file for complete search history.

(56) References Cited

U.S. PATENT DOCUMENTS

| 6,353,878 | B1 | 3/2002 | Dunham |
| 6,487,646 | B1* | 11/2002 | Adams et al. .................. 711/163 |
| 7,797,751 | B1* | 9/2010 | Hughes et al. .................. 726/26 |
| 2006/0123207 | A1 | 6/2006 | Yamamoto et al. |

OTHER PUBLICATIONS

"HP StorageWorks Secure Key Manager", 9 pages http://h18000.www.1.hp.com/products/quickspecs/12814_div/12814_div.html, Feb. 15, 2008.

* cited by examiner

*Primary Examiner* — Pramila Parthasarathy
(74) *Attorney, Agent, or Firm* — Stites & Harbison, PLLC; Juan Carlos A. Marquez, Esq

(57) ABSTRACT

Conventionally, an encryption key for encrypting data to be backed up in a tape cannot be allocated for each logical data management unit. To solve the problem, provided is a storage system including: a disk storage device; a tape storage device in which a tape storage medium is loaded; and a controller for controlling the disk storage device and the tape storage device, in which the controller is configured to: generate, upon reception of a request for setting a tape group including one or more tape storage media, a first encryption key used for encrypting data stored in the tape group set by the request; and hold information for correlating the generated first encryption key with the tape group.

12 Claims, 14 Drawing Sheets

| LOGICAL VOLUME (EXTERNAL LUN) | INTERNAL LUN | LU SIZE | PHYSICAL DISK ADDRESS |
|---|---|---|---|
| 0 | 10 | 1TB | a:0-2000, b:0-2000, ⋮ n:0-2000 |
| 1 | 11 | 500GB | a:2001-3000, b:2001-3000, ⋮ n:2001-3000 |
| ⋮ | ⋮ | ⋮ | ⋮ |

FIG. 5

TAPE MANAGEMENT TABLE

| TG | TG UNIQUE IDENTIFIER | TAPE | KEYWORD | ENCRYPTION | ... |
|---|---|---|---|---|---|
| 0 | AAAAAAAA | 1000,1001,1002 | ABCD | ON | ... |
| 1 | BBBBBBBB | 1003,1004 | EFGH | ON | ... |
| 2 | — (UNOBTAINED) | — | — | ON | ... |
| 3 | DDDDDDDD | 1005,1006,1007 | OPQR | OFF | ... |
| ⋮ | ⋮ | ⋮ | | | |

FIG. 6

KEY INFORMATION TABLE

| KEY ID | KEY DATA |
|---|---|
| aaaaaaaa | Mxxxxxxxxxxxxxxx |
| bbbbbbbb | Myyyyyyyyyyyyyyy |
| cccccccc | Mzzzzzzzzzzzzzzz |
| ⋮ | ⋮ |

11211 = KEY ID column, 11212 = KEY DATA column, 1121 = table

FIG. 7

TG KEY INFORMATION TABLE

| TG# | RESERVED KEY ID | OBTAINED KEY ID |
|---|---|---|
| 0 | aaaaaaaa | aaaaaaaa |
| 1 | bbbbbbbb | bbbbbbbb |
| 2 | cccccccc | - |
| 3 | - | - |
| ⋮ | ⋮ | |

KEY BACKUP FILE

| KEY ID | ENCRYPTED KEY DATA |
|---|---|
| aaaaaaaa | Pxxxxxxxxxxxxxxx |
| bbbbbbbb | Pyyyyyyyyyyyyyyy |
| cccccccc | Pzzzzzzzzzzzzzzz |
| ⋮ | ⋮ |

9001 = KEY ID; 9002 = ENCRYPTED KEY DATA; 900

FIG. 9

TAPE STORED INFORMATION

| (OLD) TG | TG UNIQUE IDENTIFIER | TAPE | KEYWORD | ENCRYPTION | KEY ID | ... |
|---|---|---|---|---|---|---|
| 0 | AAAAAAAA | 1000,1001,1002 | ABCD | ON | aaaaaaaa | ... |

METHOD AND SYSTEM FOR MANAGING ENCRYPTION KEY

CLAIM OF PRIORITY

The present application claims priority from Japanese application JP2008-30451 filed on Feb. 12, 2008, the content of which is hereby incorporated by reference into this application.

BACKGROUND

A technology disclosed herein relates to management of data in a storage system, and more particularly, to management of an encryption key used for storing encrypted data in a tape.

The amount of data processed by a computer system at a company or the like has been on the increase, which causes an increase in the amount of backup data to prevent data losses caused by failures or the like.

A tiered storage system is generally used to save a great amount of data at low cost. In the tiered storage system, frequently accessed data is stored in a storage medium such as a magnetic disk which is relatively costly but has high performance. On the other hand, for example, infrequently accessed data such as backup data is stored in a storage medium such as a magnetic tape which is relatively low in price.

JP 2006-163454 A and U.S. Pat. No. 6,353,878 disclose exemplary tiered storage systems.

The storage system disclosed in JP 2006-163454 A includes a disk interface for a host computer, and has a function of storing data of a logical volume in a magnetic tape.

The storage system disclosed in U.S. Pat. No. 6,353,878 backs up data from a primary data storage system to a secondary data storage system equipped with a tape library.

A technology of storing encrypted data in a tape to securely hold data is disclosed in, for example, "HP StorageWorks Secure Key Manager", [online], Hewlett-Packard Development Company. L.P., [retrieved Jan. 17, 2008], Internet <URL: http://h18000.www1.hp.com/products/quickspecs/12814_div/12814_div.h tml>

According to the technology disclosed therein, encryption keys of various particle sizes, from an encryption key for each tape library to an encryption key for each tape, are managed. "HP StorageWorks Secure Key Manager" also discloses data encryption and decryption. According to "HP StorageWorks Secure Key Manager", a tape library takes out an encryption key from Secure Key Manager when reading a tape.

SUMMARY

A conventional key management server or a key management appliance (e.g., Secure Key Manager) can identify a physical device (such as tape cartridge, tape drive, or tape library) but cannot identify a logical data management unit (for example, tape group consisting of a plurality of tapes). Thus, the conventional key management server or the like can allocate an encryption key for each physical device but cannot allocate an encryption key to a logical data management unit before the data management unit is actually generated. As a result, excessive keys have to be managed to assure security strength, causing a problem of complex key management.

According to a representative invention disclosed in this application, there is provided a storage system, comprising: a disk storage device; a tape storage device in which a tape storage medium can be loaded; and a controller for controlling the disk storage device and the tape storage device, wherein: the controller includes a first interface coupled to a network, at least one second interface coupled to the disk storage device and the tape storage device, a processor coupled to the first interface and the second interface, and a memory coupled to the processor; and the controller is configured to: generate, upon reception of a request for setting a tape group including one or more tape storage media, a first encryption key used for encrypting data to be stored in the tape group set by the request; and hold information for correlating the generated first encryption key with the tape group.

According to an embodiment of this invention, an encryption key for encrypting data to be backed up in the tape can be allocated for each logical data management unit. Thus, the number of used encryption keys can be reduced to a minimum.

BRIEF DESCRIPTION OF THE DRAWINGS

FIG. 5 illustrates a disk management table according to the embodiment of this invention.

FIG. 6 illustrates a tape management table according to the embodiment of this invention.

FIG. 7 illustrates a key information table according to the embodiment of this invention.

FIG. 8 illustrates a TG key information table according to the embodiment of this invention.

FIG. 9 illustrates a key backup file according to the embodiment of this invention.

FIG. 10 illustrates tape stored information according to the embodiment of this invention.

DETAILED DESCRIPTION OF THE PREFERRED EMBODIMENTS

Figure 1:
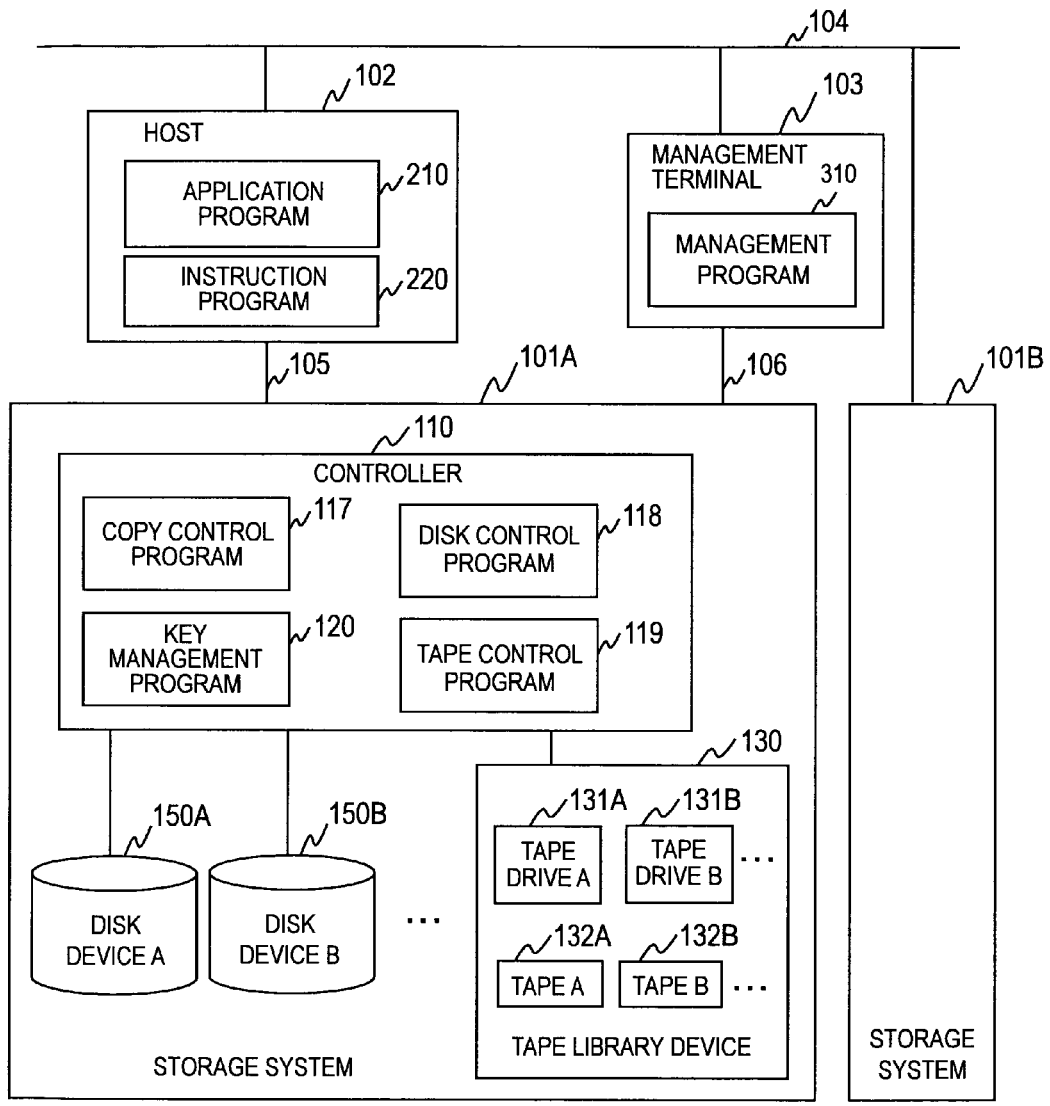
FIG. 1 is a block diagram illustrating a configuration of a computer system according to an embodiment of this invention.

Hereinafter, an embodiment of this invention will be described referring to the drawings.

FIG. 1 is a block diagram illustrating a configuration of a computer system according to the embodiment of this invention.

The computer system of this embodiment includes at least a storage system 101A, a host 102, and a management terminal 103.

The storage system 101A is coupled to the host 102 via a network 105, and to the management terminal 103 via a network 106. The host 102 is coupled to the management terminal 103 via a network 104.

The networks 104 to 106 may be any types of networks. For example, the networks 104 and 106 may be internet protocol (IP) networks such as local area networks (LAN). The network 105 may be a network similar to the networks 104 and 106, or a so-called storage area network to which fibre channel (FC) protocol is applied.

The host 102 is a computer which provides various services to users. The host 102 includes an interface (not shown) coupled to the networks 104 and 105, a processor (not shown) coupled to the interface, and a memory (not shown) coupled to the processor.

The memory of the host 102 stores an application program 210 and an instruction program 220. The application program 210 is executed by the processor so that the host 102 can provide services to a user. The processor that executes the application program 210 issues, when necessary, a request of accessing data in the storage system 101A (in other words, data writing or reading request). The instruction program 220 is executed by the processor so that the user can instruct the storage system 101A to back up data.

In an example of FIG. 1, the host 102 holds the instruction program 220. However, any device in the computer system may hold and execute the instruction program 220. For example, the management terminal 103 or the storage system 101A may hold and execute the instruction program 220.

The management terminal 103 is a computer for managing the computer system of this embodiment. The management terminal 103 includes an interface (not shown) coupled to the networks 104 and 106, a processor (not shown) coupled to the interface, and a memory (not shown) coupled to the processor.

The memory of the management terminal 103 stores a management program 310. The management program 310 is executed by the processor to manage data backup of the storage system 101A. In the description below, a process executed by the management program 310 is actually executed by the processor (not shown) of the management terminal 103.

The storage system 101A stores data written by the host 102. The storage system 101A of this embodiment includes a controller 110, at least one disk device 150, and at least one tape library device 130.

The controller 110 holds at least a copy control program 117, a disk control program 118, a tape control program 119, and a key management program 120 to control the disk device 150 and the tape library device 130. A configuration of the controller 110 will be described below in detail referring to FIG. 2.

The disk device 150 is typically a magnetic disk drive, but a semiconductor memory device such as a flash memory or another type of a storage system may be employed. Each of the disk devices A150A and B150B shown in FIG. 1 is one of the plurality of disk devices 150. The storage system 101A may include more disk devices 150 (e.g., disk device 150N shown in FIG. 3). The plurality of disk devices 150 may constitute redundant arrays of inexpensive disks (RAID).

Figure 3:
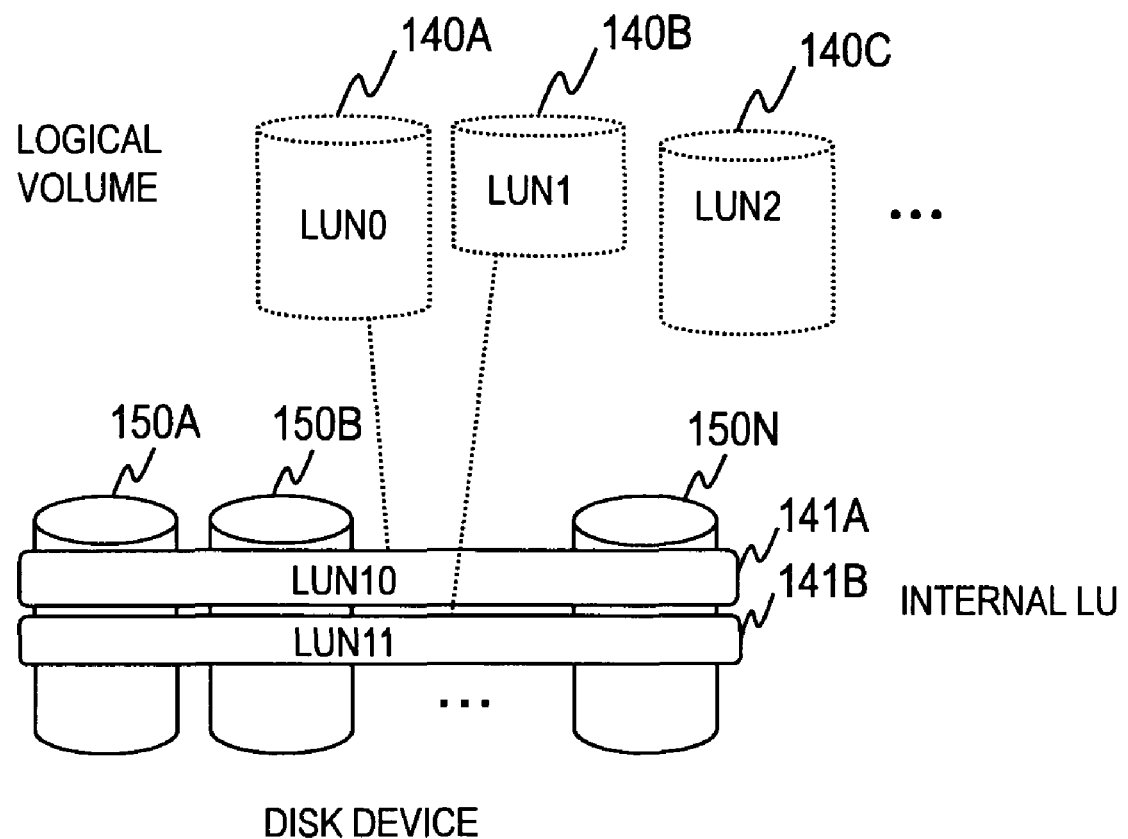
FIG. 3 illustrates storage areas provided by disk devices of the embodiment of this invention.

Referring to FIG. 3, storage areas provided by the disk devices 150 will be described.

FIG. 3 illustrates the storage areas provided by the disk devices 150 of the embodiment of this invention.

In an example of FIG. 3, storage areas of the plurality of disk devices 150 are divided into one or more internal logical units (LU) 141 to be managed. For example, as shown in FIG. 3, a set of some storage areas of the disk devices 150 may be managed as one internal LU 141.

Each of internal LU's 141A and 141B shown in FIG. 3 is one of a plurality of internal LU's 141. LUN 10 and LUN 11 shown in FIG. 3 are identifiers of the internal LU's 141A and 141B, respectively. The controller 110 can set an optional number of internal LU's 141 of optional capacities.

Each internal LU 141 corresponds to one logical volume 140. In the example of FIG. 3, logical volumes 140A and 140B correspond to the internal LU's 141A and 141B. In this example, a logical volume 140C does not correspond to any internal LU 141. Each of the logical volumes 140A, 140B, and 140C is one of a plurality of logical volumes 140. LUN 0, LUN 1, and LUN 2 shown in FIG. 3 are identifiers of the logical volumes 140A, 140B, and 140C, respectively.

Each logical volume 140 is recognized as one logical storage system by the host 102. For example, when the host 102 issues a request of writing data in the logical volume 140A, the controller 110 stores the requested data in the internal LU 141A corresponding to the logical volume 140A.

The data stored in each logical volume 140 (in other words, data actually stored in each internal LU 141) is backed up in at least one tape 132 according to a backup instruction from the instruction program 220. In other words, according to the backup instruction, a copy of data stored in each logical volume 140 is stored in at least one tape 132.

Referring back to FIG. 1, the tape library device 130 includes at least one tape drive 131 and at least one tape 132. The tape library device 130 shown in FIG. 1 includes tape drives A131A and B131B, and tapes A132A and B132B. Each of the tape drives A131A and B131B is one of a plurality of tape drives 131. Each of the tapes A132A and B132B is one of a plurality of tapes 132.

Figure 4:
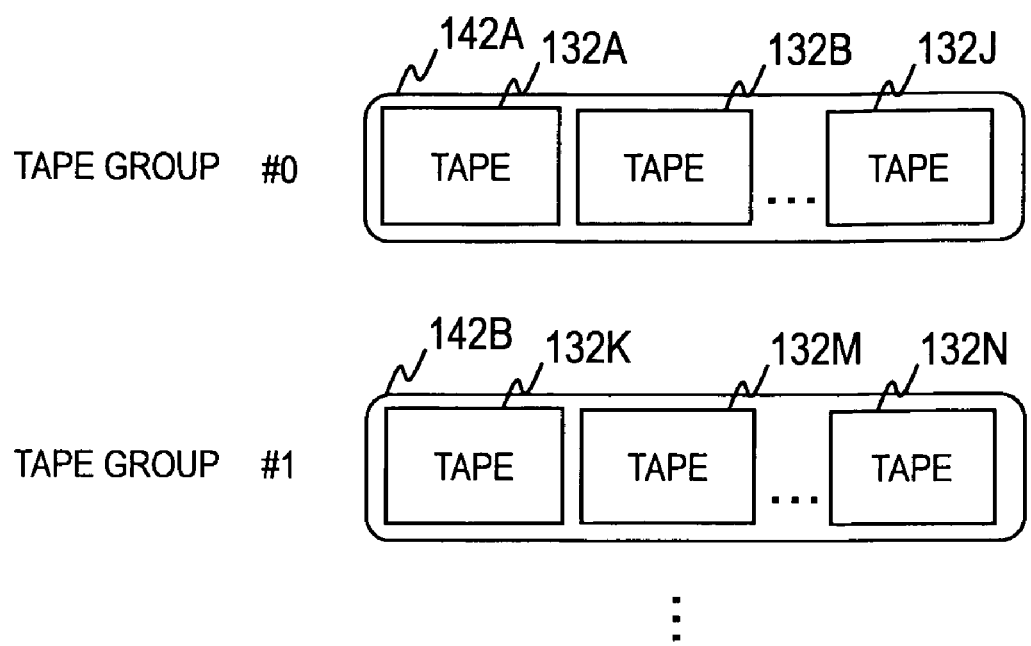
FIG. 4 illustrates tape groups according to the embodiment of this invention.

One or more tapes 132 may constitute one tape group 142 as shown in FIG. 4. The tape library device 130 may include more tape drives 131 and tapes 132.

Each tape 132 specifically corresponds to one tape storage medium (tape medium). One tape medium may be a so-called tape cartridge which includes, for example, one-wound tape (magnetic recording tape) and a case for housing the tape. The tape medium may include a storage medium other than the wound tape. The storage medium other than the wound tape is, for example, a barcode attached to the case, or a nonvolatile storage medium such as a magnetic storage medium or a flash memory. When the case houses such a storage medium, the tape drive 131 has a function of reading data from the storage medium.

As shown in FIG. 1, the computer system of this embodiment may further include a storage system 101B. The storage system 101B is coupled to the network 104. A configuration of the storage system 101B is similar to that of the storage system 101A, and thus description thereof will be omitted.

Figure 2:
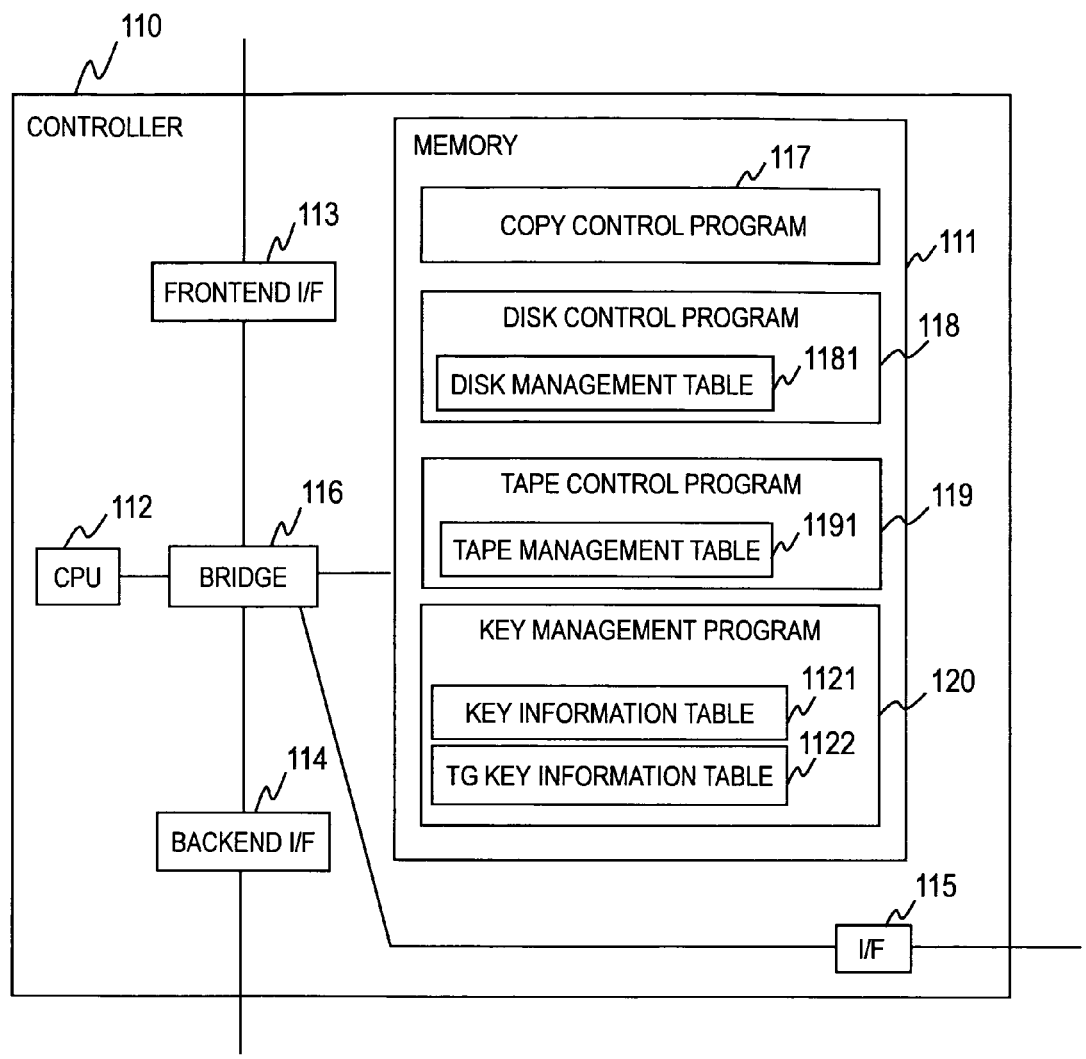
FIG. 2 is a block diagram illustrating a configuration of a controller according to the embodiment of this invention.

FIG. 2 is a block diagram illustrating a configuration of the controller 110 according to the embodiment of this invention.

The controller 110 of this embodiment includes a memory 111, a CPU 112, a frontend interface (I/F) 113, a backend I/F 114, an I/F 115, and a bridge 116.

The memory 111 is, for example, a data storage system such as a semiconductor memory device. The memory 111 stores a program executed and data referred to by the CPU 112. The memory 111 of this embodiment stores at least the copy control program 117, the disk control program 118, the tape control program 119, and the key management program 120.

The disk control program 118 includes a disk management table 1181.

The tape control program 119 includes a tape management table 1191.

The key management program 120 includes a key information table 1121 and a tape group (TG) key information table 1122.

The programs and the tables will be described below in detail.

The CPU 112 is a processor for executing the program stored in the memory 111. In the description below, a process executed by each program is actually executed by the CPU 112 which executes the program.

The frontend I/F 113 couples the controller 110 to the host 102 via the network 105. The backend I/F 114 couples the controller 110 to the disk device 150. The frontend I/F 113 and the backend I/F 114 may be, for example, SCSI adaptors or FC adaptors.

The I/F 115 couples the controller 110 to the management terminal 103 via the network 106. When the network 106 is a LAN, the I/F 115 may be a so-called network interface card.

The bridge 116 intercouples the memory 111, the CPU 112, the frontend I/F 113, the backend I/F 114, and the I/F 115, and controls communication carried out among them.

FIG. 4 illustrates the tape groups 142 according to the embodiment of this invention.

Each tape group 142 including one or more tapes 132 is a logical management unit of backed up data. For example, a storage capacity allocated to one logical volume 140 may be larger than a storage capacity of one tape 132. In this case, one tape group including a plurality of tapes 132 may store data of one logical volume 140. Data of a plurality of logical volumes may be stored in one tape group.

As a typical backup example, backup of data stored in the logical volume 140 in the tape group 142 will be described below. However, the data stored in the tape group 142 may be backed up in another tape group 142.

In an example of FIG. 4, a tape group 142A to which a tape group number "0" is assigned includes tapes 132A to 132J. A tape group 142B to which a tape group number "1" is assigned includes tapes 132K to 132N.

FIG. 5 illustrates the disk management table 1181 according to the embodiment of this invention.

The disk management table 1181 holds information necessary for managing the storage area of the disk device 150.

The disk management table 1181 includes a logical volume 11811, an internal LUN 11812, an LU size 11813, and a physical disk address 11814.

The logical volume 11811 indicates an identifier (in other words, external LUN) of the logical volume 140. For example, in FIG. 5, "0" and "1" are stored as logical volumes 11811, which correspond to the LUN 0 and the LUN 1 shown in FIG. 3, respectively.

The internal LUN 11812 indicates an identifier of the internal LUN 141 corresponding to the logical volume 140. For example, in FIG. 5, "10" and "11" are stored as internal LUN's 11812 corresponding to the LUN 0 and the LUN 1, which correspond to the LUN 10 and the LUN 11 shown in FIG. 3, respectively.

The LU size 11813 indicates a size of a storage area allocated to each internal LU 141, in other words, the amount of data to be stored in the storage area. For example, in FIG. 5, as LU sizes 11813 corresponding to the LUN 00 and the LUN 01, "1 terabyte (TB)" and "500 gigabytes (GB)" are stored, respectively, indicating that storage areas of 1 TB and 500 GB are allocated as the LUN 10 and the LUN 11, respectively.

The physical disk address 11814 indicates an address of a storage area of the disk device 150 allocated to each internal LU 141. For example, in FIG. 5, as physical disk addresses 11814 corresponding to the LUN 10, "A: 0-2000, B: 0-2000, . . . , N: 0-2000" are stored, indicating that at least a storage area from the address 0 to the address 2000 of the disk device 150A, a storage area from the address 0 to the address 2000 of the disk device 150B, and a storage area from the address 0 to the address 2000 of the disk device 150N are allocated as LUN's 10.

FIG. 6 illustrates the tape management table 1191 according to the embodiment of this invention.

The tape management table 1191 holds information necessary for managing the tape group 142.

The tape management table 1191 includes a TG 11911, a TG unique identifier 11912, a tape 11913, a keyword 11914, and encryption 11915.

The TG 11911 indicates a number allocated to each tape group 142. For example, in FIG. 6, "0" and "1" are stored in the TG 11911. Those numbers are allocated to the tape groups 142A and 142B shown in FIG. 4. Though not shown in FIG. 4, the computer system of this embodiment may include more tape groups 142. For example, in FIG. 6, "2" and "3" are further stored in the TG 11911. Those numbers are allocated to the tape groups 142 not shown.

In the description below, for convenience, the tape groups 142 identified by the tape group numbers "0", "1", "2", and "3" are also referred to as TG#0, TG#1, TG#2, and TG#3.

The TG 11911 is allocated by the controller 110 to manage the tape group 142. The controller 110 allocates a unique number within its management range as a TG 11911 to each tape group 142. However, there is no guarantee that the TG 11911 is unique for the entire computer system.

The TG unique identifier 11912 indicates a unique (in other words, unique in the computer system) identifier allocated to each tape group 142.

The tape 11913 is an identifier of each tape 132 included in each tape group 142. For example, in FIG. 6, "1000, 1001, and 1002" are stored in the tape 11913 corresponding to the TG#0. This indicates that the TG#0 includes three tapes 132 identified by the identifiers "1000", "1001", and "1002".

Figure 16:
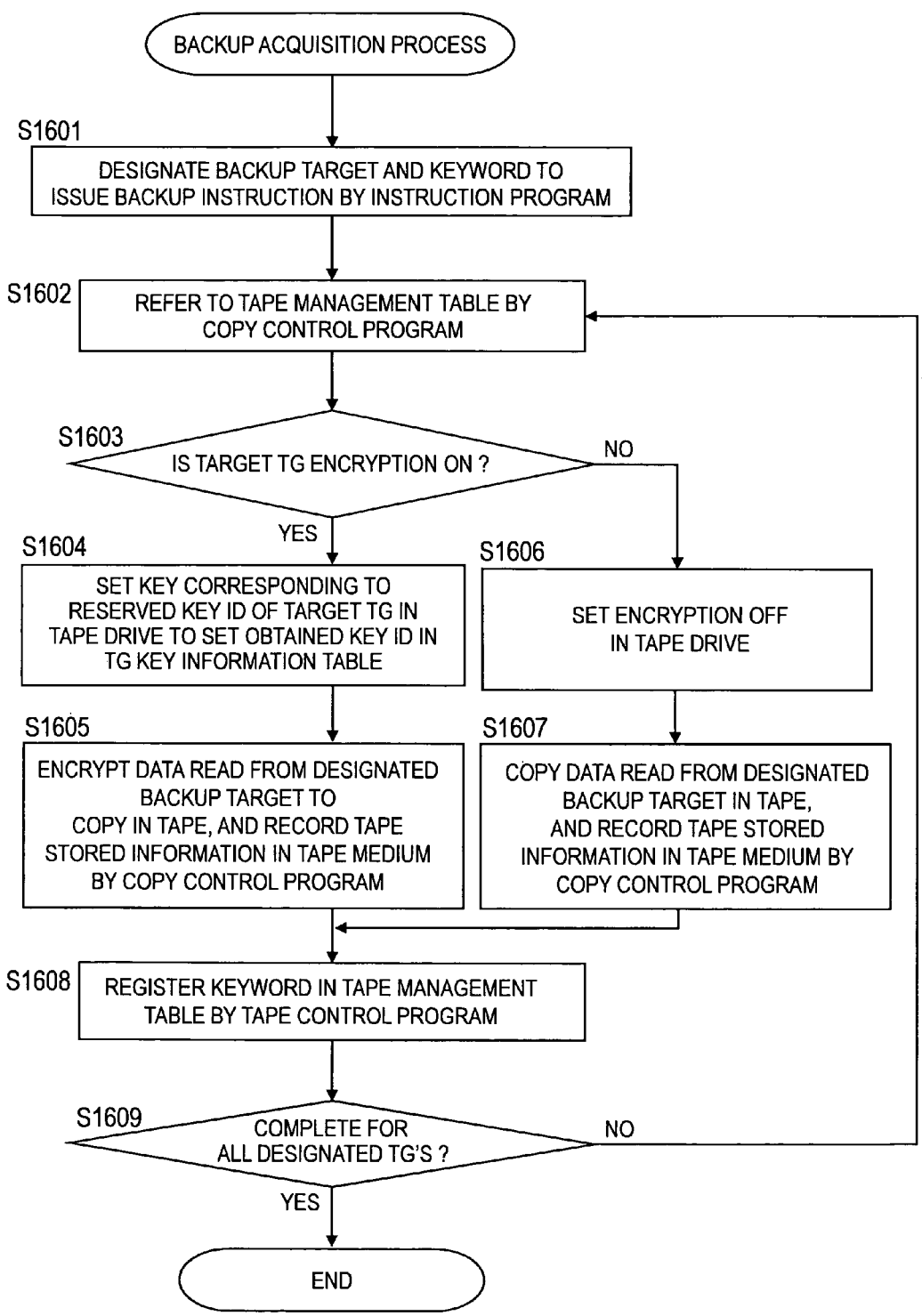
FIG. 16 is a flowchart illustrating a backup acquisition process according to the embodiment of this invention.

The keyword 11914 indicates a keyword used by a user to retrieve a tape group 142. The user can designate an optional keyword when backing up data in the tape group 142 as shown in FIG. 16. For example, the user may designate an identifier of a logical volume 140 of a backup source, or a date and time of executing backup as a keyword. The keyword thus designated is stored in the keyword 11914. In the example of FIG. 6, "ABCD" is stored in the keyword 11914 corresponding to the TG#0.

Figure 17:
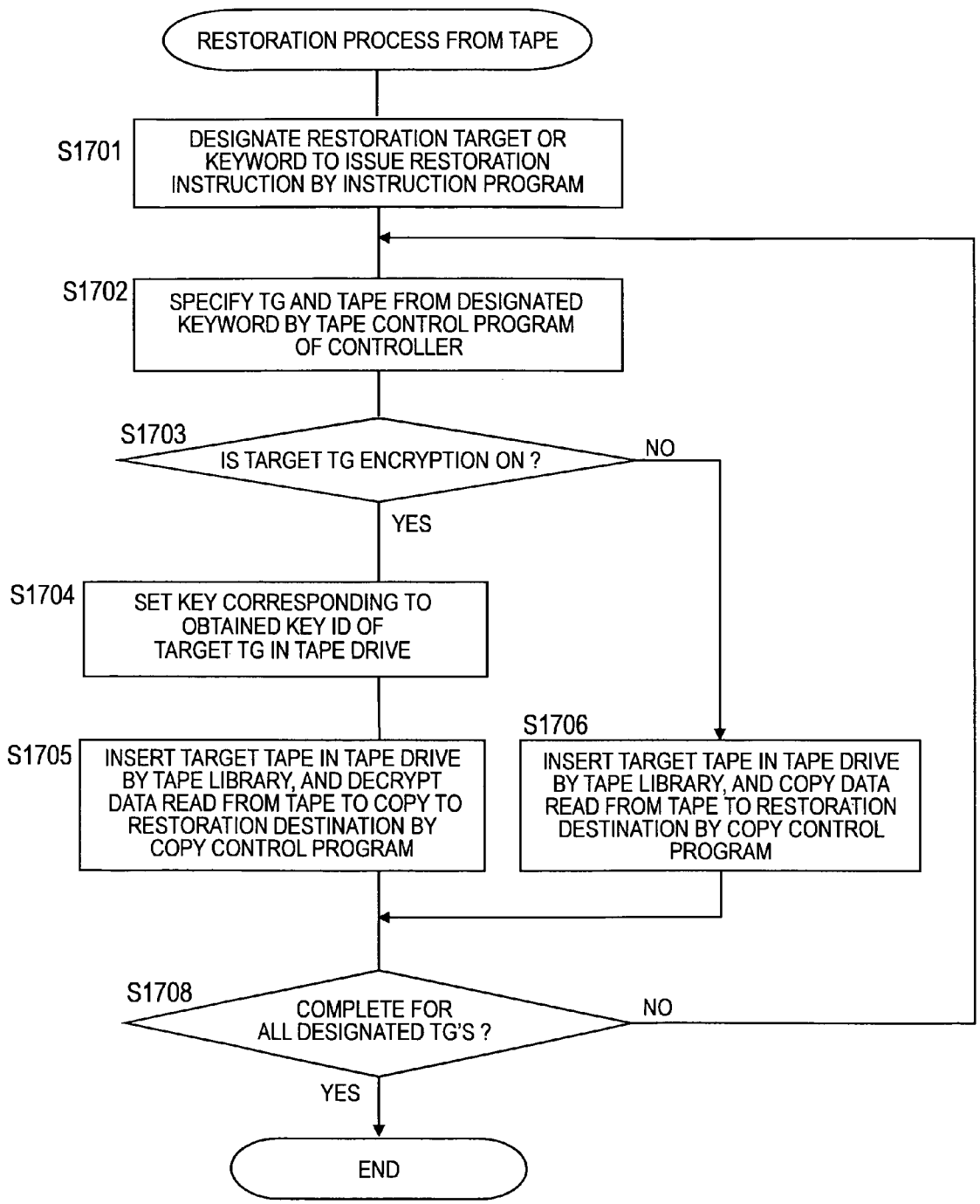
FIG. 17 is a flowchart illustrating a restoration process from a tape according to the embodiment of this invention.

The user can restore the logical volume 140 by copying data stored in the tape group 142 to the logical volume 140. When executing this copying, the user can designate a tape group 142 of a copy source based on the keyword stored in the keyword 11914 as shown in FIG. 17.

The encryption 11915 is information indicating whether each tape group 142 stores encrypted data. "ON" indicates that encrypted data is stored, while "OFF" indicates that unencrypted (in other words, plaintext) data is stored. When executing backup of data in the tape group 142, the user first encrypts the data to decide whether to store the data in the tape group 142, and then can set a value (in other words, "ON" or "OFF") indicating a result of the decision in the encryption 11915.

FIG. 7 illustrates the key information table 1121 according to the embodiment of this invention.

The key information table 1121 holds an encryption key itself used for encrypting the data stored in the tape group 142. Specifically, the key information table 1121 includes a key ID 11211 and key data 11212.

The key ID 11211 is an identifier of an encryption key.

The key data 11212 is a data row used for encrypting the data stored in the tape group 142. This encryption key may be recorded in a plaintext state, but preferably be encrypted by, for example, a predetermined encryption key held by the controller 110 to prevent illegal reading or use of the encryption key.

For example, "aaaaaaaa" and "Mxxxxxxxxxxxxxxxx" are recorded in the key ID 11211 and the key data 11212. In this case, an encryption key obtained by the identifier "aaaaaaaa" is "Mxxxxxxxxxxxxxxxx". If this encryption key has been encrypted by a predetermined encryption key, a data row obtained by decrypting the "Mxxxxxxxxxxxxxxxx" is used as an encryption key.

FIG. 8 illustrates the TG key information table 1122 according to the embodiment of this invention.

The TG key information table 1122 manages an encryption key used to encrypt data stored in each tape group 142. Specifically, the TG key information table 1122 includes a TG number 11221, a reserved key ID 11222, and an obtained key ID 11223.

The TG number 11221 is a number assigned to each tape group 142.

The reserved key ID 11222 is an identifier of an encryption key used for encrypting data to be stored next in each tape group 142.

The obtained key ID 11223 is an identifier of an encryption key used for encrypting data currently stored in each tape group 142.

For example, in FIG. 8, "aaaaaaaa" and "aaaaaaaa" are recorded in the reserved key ID 11222 and the obtained key ID 11223 corresponding to the TG#0, respectively. This indicates that data currently stored in the TG#0 has been encrypted by an encryption key identified by "aaaaaaaa", and that data to be stored next in the TG#0 has been encrypted by an encryption key identified by "aaaaaaaa".

On the other hand, in FIG. 8, "cccccccc" is stored in the reserved key ID 11222 corresponding to the TG#2, while no valid value is stored in the obtained key ID 11223. This indicates that encrypted data is yet to be stored in the TG#2, and that data to be stored next in the TG#2 has been encrypted by an encryption key identified by "cccccccc".

FIG. 9 illustrates a key backup file 900 according to the embodiment of this invention.

The key backup file 900 is created to back up an encryption key recorded in the key information table 1121, and stored by an administrator.

For example, when a copy of data stored in the logical volume 140 is encrypted to be stored in the tape group 142 for backup, the data cannot be restored in the logical volume 140 unless the data is read from the tape to be decrypted by using an encryption key used for encryption. Accordingly, if the encryption key is lost during the period from backup to restoration, the data cannot be restored.

A tape group 142 that stores data encrypted by a controller 110 of a certain storage system (e.g., storage system 101A) may be loaded in another storage system (e.g., storage system 101B) to restore data in a logical volume 140 of the storage system 101B. An encryption key that has been used for encryption is recorded in a key information table 1121 of the controller 110 (controller 110 of the storage system 101A in the example) which has executed the encryption. Thus, the controller 110 of the storage system 101B cannot restore data of the tape group 142 unless the controller 110 of the storage system 101B holds the encryption key. This arrangement is effective for preventing illegal reading of backup data. However, when the tape group 142 is mounted on another storage system 101B for legitimate use, an encryption key has to be safely provided to the storage system 101B.

The key backup file 900 is created for safely storing an encryption key to prepare for such a case.

The key backup file 900 includes a key ID 9001 and encrypted key data 9002.

The key ID 9001 is an identifier of an encryption key. This identifier corresponds to the key ID 11211 of the key information table 1121.

The encrypted key data 9002 is data generated by encrypting the encryption key recorded in the key information table 1121 by another encryption key. If the encryption key recorded in the key information table 1121 has been encrypted by a predetermined encryption key, the encryption key is decrypted by the predetermined encryption key, and then encrypted by a protection key described below to generate key data 9002.

In order to distinguish the encryption keys from each other, in the description below, the encryption key registered in the key information table 1121 (in other words, encryption key used for encrypting data stored in the tape group 142) is also referred to as a data encryption key. On the other hand, the encryption key used for encrypting the data encryption key is also referred to as a protection key.

The protection key is an encryption key used for safely backing up the encryption key recorded in the key information table 1121. The key management program 120 can generate a protection key based on an optional password entered by the administrator.

For example, in FIG. 9, "Pxxxxxxxxxxxxxxxx" is recorded in the encrypted key data 9002 corresponding to a value "aaaaaaaa" of the key ID 9001. This indicates that the "Pxxxxxxxxxxxxxxxx" is data generated by encrypting the encryption key "Mxxxxxxxxxxxxxxxx" corresponding to the value "aaaaaaaa" of the key ID 11211 shown in FIG. 7 by a protection key.

The administrator can store the generated key backup file 900 in an optional place, for example, the management terminal 103, the host 102, or a storage medium (not shown) not included in the computer system shown in FIG. 1.

FIG. 10 illustrates tape stored information 1000 according to the embodiment of this invention.

The tape stored information 1000 is stored, when data is stored in the tape group 142 to be backed up, in a tape medium included in the tape group. For example, the tape stored information 1000 may be stored in a head or a tail of a wound tape included in the tape medium. Alternatively, a part of the tape stored information 1000 may be stored in the head of the tape, while another part may be stored in the tail of the tape. Alternatively, when the tape medium includes a storage medium such as a flash memory attached to a case, the tape stored information 1000 may be stored in the storage medium.

The tape stored information includes a TG 10001, a TG unique identifier 10002, a tape 10003, a keyword 10004, encryption 10005, and a key ID 10006.

The TG 10001, the TG unique identifier 10002, the tape 10003, the keyword 10004, and the encryption 10005 correspond to the TG 11911, the TG unique identifier 11912, the tape 11913, the keyword 11914, and the encryption 11915 of FIG. 6, respectively. The key ID 10006 corresponds to the key ID 11211 of FIG. 7.

Figure 14:
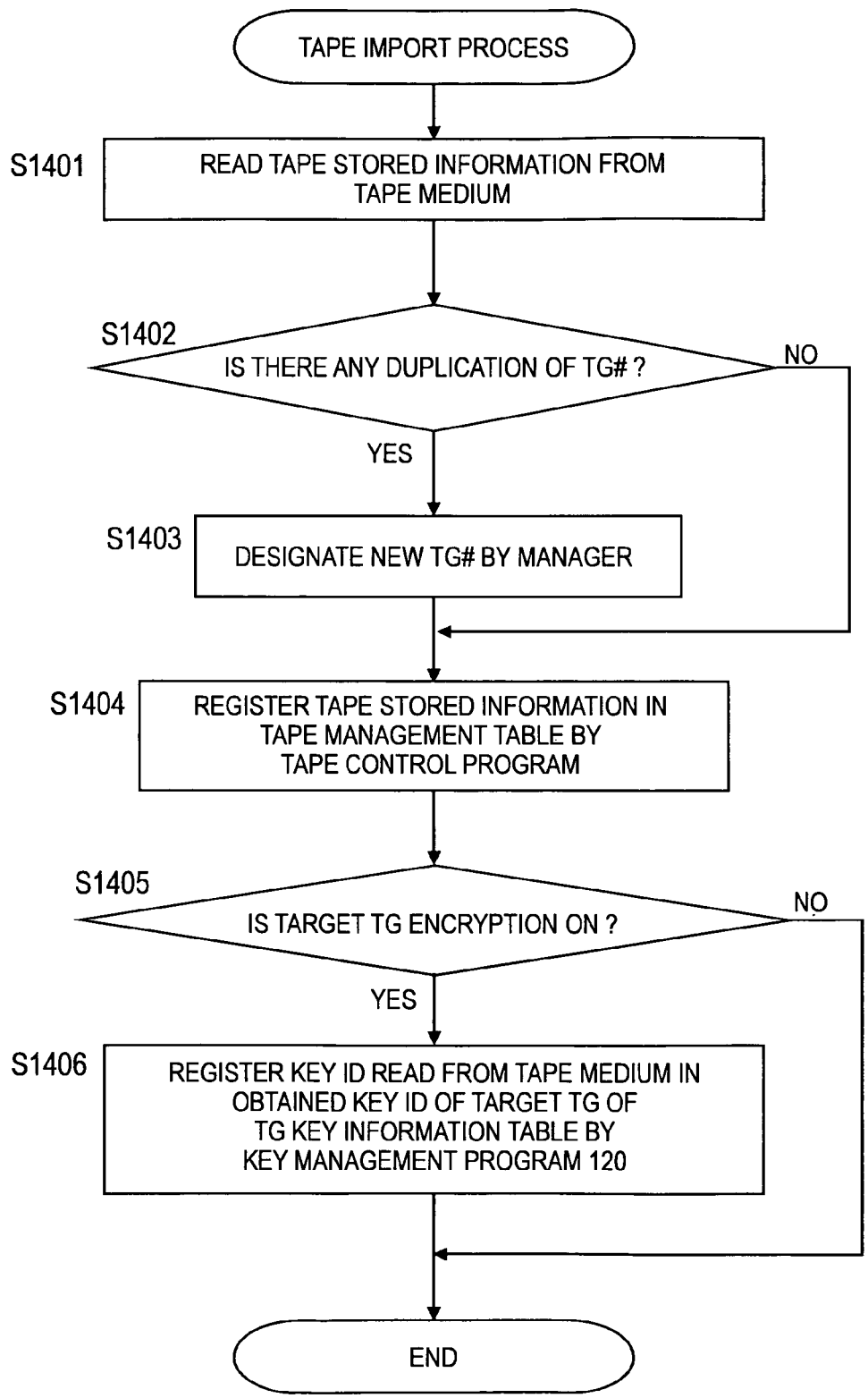
FIG. 14 is a flowchart illustrating a tape import process according to the embodiment of this invention.
Figure 15:
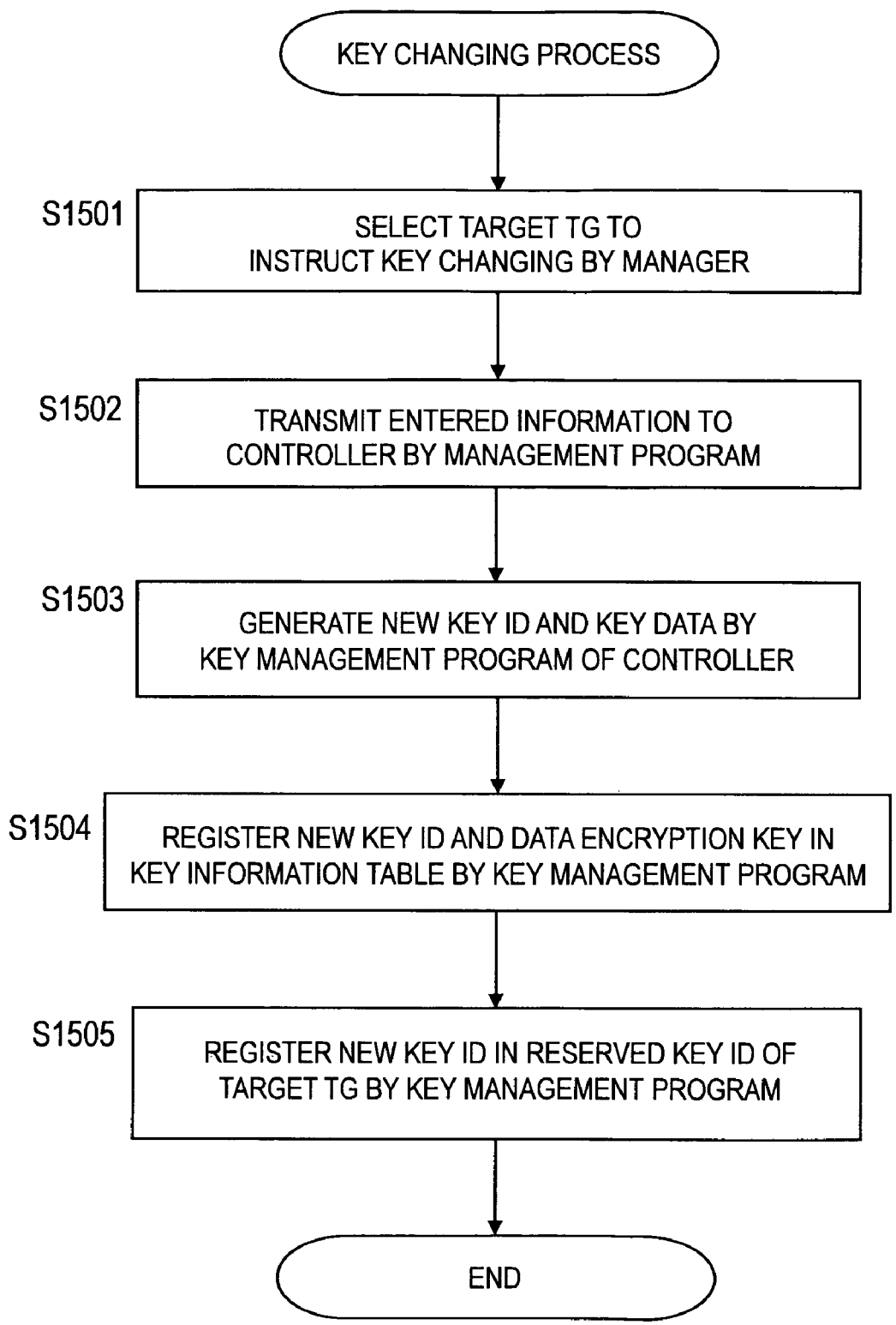
FIG. 15 is a flowchart illustrating a key changing process according to the embodiment of this invention.

Processes executed according to this embodiment will be described below referring to flowcharts. A TG setting process of FIG. 11 and a key backup process of FIG. 12 are carried out before the data stored in the logical volume 140 is backed up in the tape group 142. A key restoration process of FIG. 13 and a tape import process of FIG. 14 are carried out before the data backed up in the tape group 142 is restored in the logical volume 140. A key changing process of FIG. 15 is carried out to change an encryption key. A backup acquisition process of FIG. 16 and a restoration process from tape in FIG. 17 are carried out to back up the data stored in the logical volume 140 in the tape group 142, and to restore the data stored in the tape group 142 in the logical volume 140, respectively. Those processes will be described below in detail.

Figure 11:
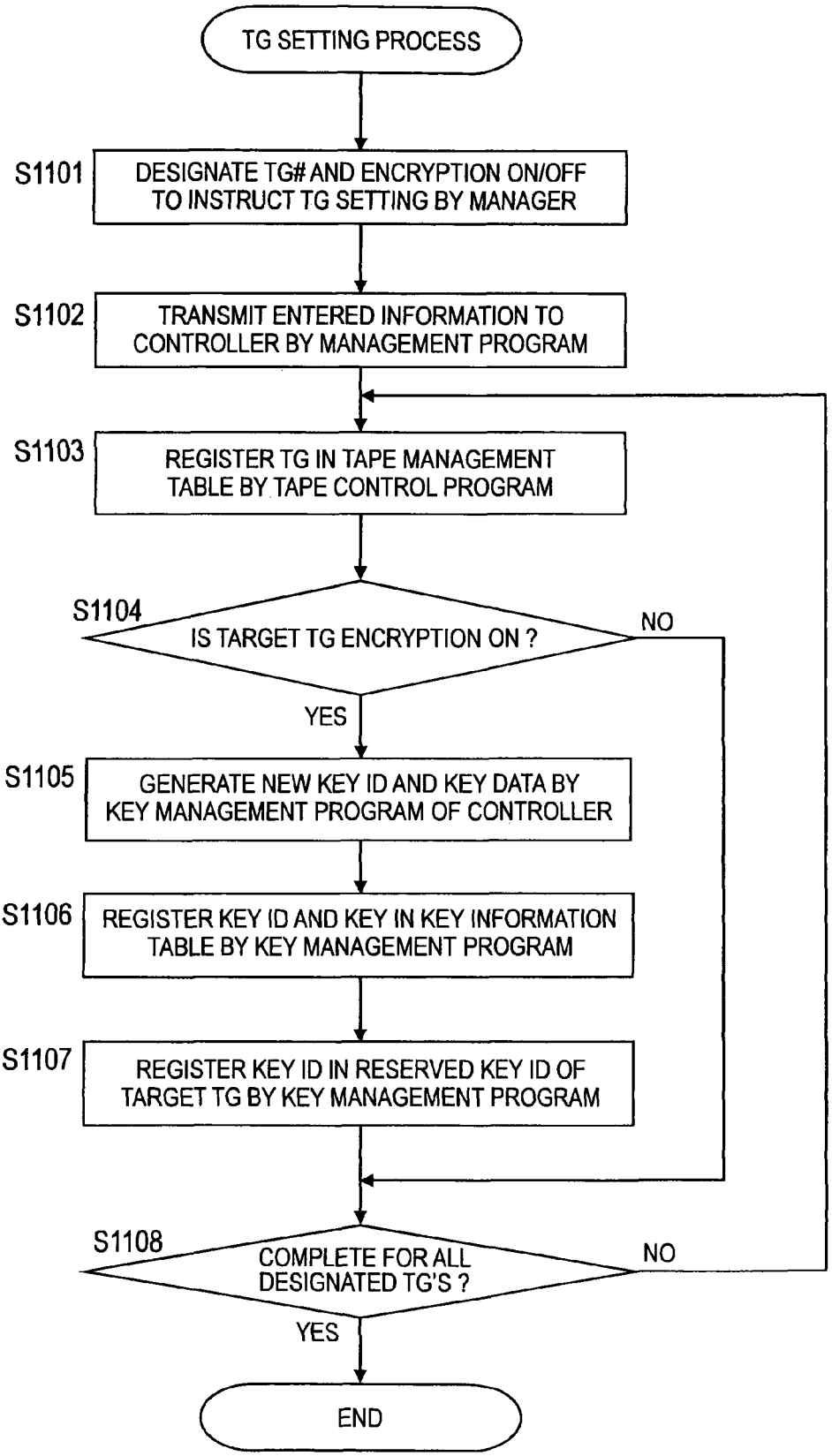
FIG. 11 is a flowchart illustrating a TG setting process according to the embodiment of this invention.
Figure 12:
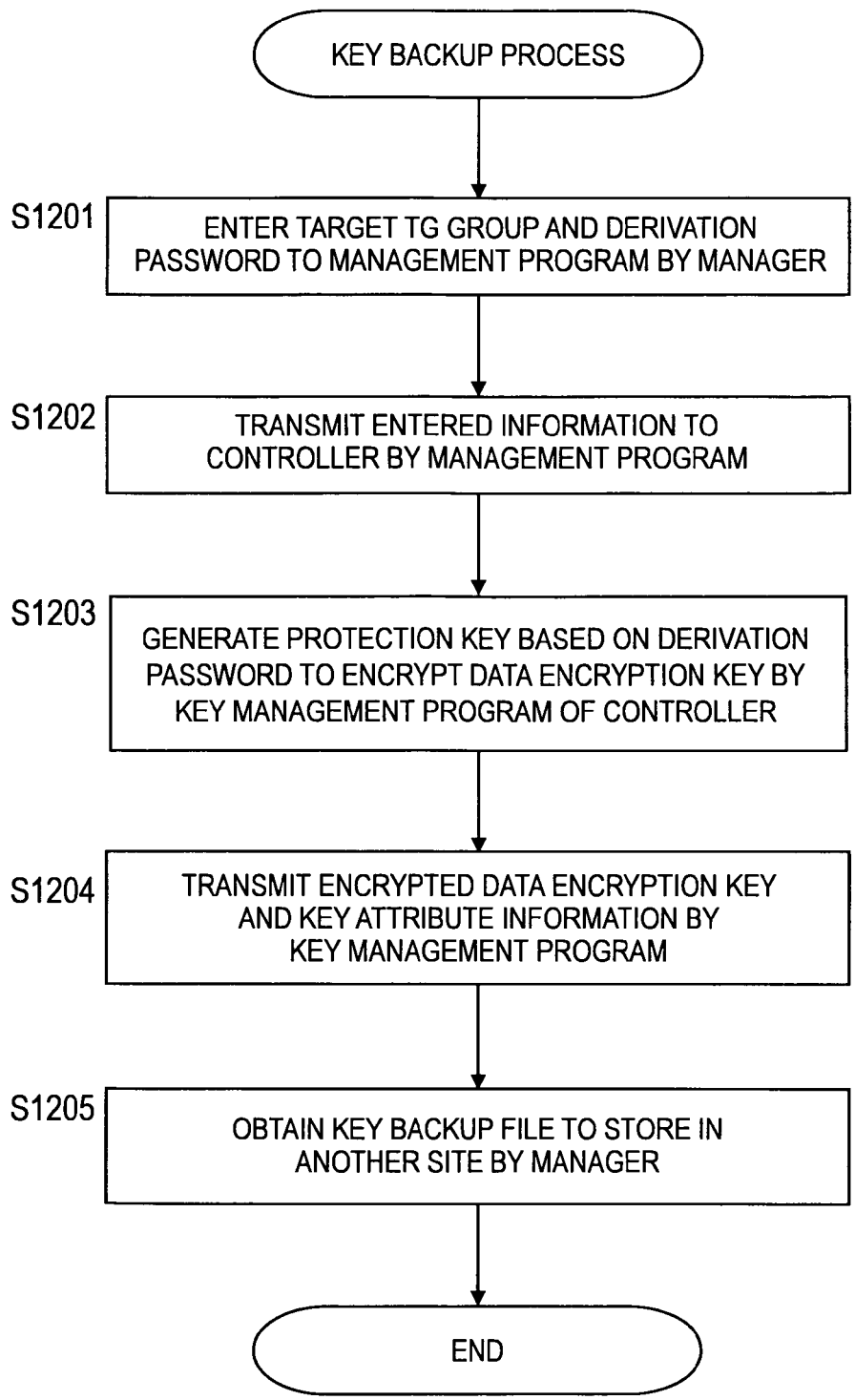
FIG. 12 is a flowchart illustrating a key backup process according to the embodiment of this invention.

FIG. 11 is a flowchart illustrating the TG setting process according to the embodiment of this invention.

The TG setting process is carried out to set a new tape group 142 which becomes a data backup destination.

First, the administrator designates at least a tape group number and encryption ON/OFF to instruct setting of a tape group 142 (S1101). Specifically, for example, the administrator enters the designation to the management terminal 103.

The tape group number is assigned to a tape group 142 to be newly set. The administrator can designate an optional number among numbers yet to be registered in the TG 11911 of the tape management table 1191. The administrator may designate a plurality of tape group numbers when a plurality of new tape groups 142 have to be set.

The encryption ON/OFF is a value indicating whether to store encrypted data in the newly set tape group 142. The administrator can designate, based on contents of data to be backed up, encryption "ON" (in other words, storing of encrypted data in the tape group 142) or encryption "OFF" (in other words, storing of unencrypted data in the tape group 142).

The management program 310 that has received the designation transmits information containing the entered designation to the controller 110 (S1102).

Upon reception of this information, the tape management table 1191 process registers the tape group 142 in the tape management table 1191 of the controller 110 according to the designation (S1103). Specifically, the tape control program 119 adds a new line to the tape management table 1191, and registers a designated tape group number in the TG 11911 of the line.

The tape control program 119 judges whether to store encrypted data in the tape group 142 newly set through the TG setting process (S1104). Specifically, the tape control program 119 judges which of encryption "ON" and encryption "OFF" has been designated.

If the encryption "OFF" has been designated, an encryption key to encrypt data stored in the newly set tape group 142 does not have to be generated. Accordingly, the process proceeds to Step S1108.

On the other hand, if the encryption "ON" has been designated, the key management program 120 generates a new key ID and new key data (S1105).

The key management program 120 registers the key ID and the key data which have been generated in the key ID 11211 and the key data 11212 of the key information table 1121, respectively (S1106).

The key management program 120 registers the generated key ID in a reserved key ID 11222 corresponding to a designated tape group number (TG number 11221) of the TG key information table 1122 (S1107).

The controller 110 judges whether the process of Steps S1103 to S1107 has been finished for all the tape group numbers designated in Step S1101 (S1108). If the process has not been finished for all the tape group numbers, the process returns to Step S1103 to execute the process of Step S1103 and steps after S1103 for the remaining tape group numbers.

On the other hand, if the process has been finished for all the tape group numbers, the TG setting process is finished.

For example, when a tape group number "2" and encryption "ON" are designated in Step S1101, "2" and encryption "ON" are registered in the TG 1191, and the encryption 11915 of the new line added to the tape management table 1191 (S1103). At this point, a backup process for storing data in the tape group 142 (in other words, TG#2) to which the tape group number "2" has been assigned is yet to be executed. Accordingly, no TG unique identifier 11912 has been assigned to the TG#2, and no tape 132 has been allocated. No keyword to retrieve the TG#2 has been set. Thus, at this point, valid values are yet to be registered in the TG unique identifier 11912, the tape 11913, and the keyword 11914 as shown in FIG. 6.

Then, for example, when "ccccccc" and "Mzzzzzzzzzzzzzzzz" are generated as a new key ID and new key data in Step S1105, those values are registered in the new line added to the key information table 1121 (S1106) as shown in FIG. 7.

The generated "ccccccc" is registered in the reserved key ID 11222 corresponding to the tape group number "2" in the TG key information table 1122 (S1107). At this point, because data encrypted by a newly generated data encryption key is yet to be stored in the tape group 142, no valid value has been registered in an obtained key ID 11223 corresponding to the tape group number "2" as shown in FIG. 8.

Normally, data to be backed up in the tape group 142 is read from the logical volume 140, and then compressed and encrypted when necessary to be stored in the tape group 142. The amount of data after compression depends on redundancy of data before compression or a used compression algorithm. Accordingly, prediction of the amount of compressed data before the data is compressed is difficult. Thus, no tape 132 can be allocated to the tape group 142 before backup is executed.

According to this embodiment, however, by carrying out the process of FIG. 11, a data encryption key can be allocated to the tape group 142 to which a tape 132 is yet to be allocated.

FIG. 12 is a flowchart illustrating a key backup process according to the embodiment of this invention.

The key backup process is carried out to back up a generated data encryption key, in other words, at least one of encryption keys registered in the key information table 1121. For security, this encryption key is encrypted by a protection key to be backed up.

The administrator enters a tape group number and a derivation password of a tape group 142 which becomes a key backup target in the management program 310 (S1201). The administrator may designate a plurality of tape groups 142 as key backup targets. In this case, a plurality of tape group numbers are entered in Step S1201.

The derivation password is used for generating a protection key as described below. The administrator can enter an optional character string or the like as a derivation password.

The management program 310 transmits the entered information to the controller 110 (S1202).

The key management program 120 of the controller 110 that has received the information generates a protection key based on the derivation password, and encrypts the data encryption key by using the generated protection key (S1203).

Specifically, the key management program 120 refers to the TG key information table 1122 to specify a key ID registered in at least one of the reserved key ID 11222 and the obtained key ID 11223 corresponding to the tape group number 11221 identical to the entered tape group number. Then, the key management program 120 refers to the key information table 1121 to obtain key data 11212 corresponding to a key ID 11211 identical to the specified key ID, and encrypts the key data 11212.

Upon entry of the plurality of tape group numbers in Step S1201, the process of Step S1203 is executed for all the entered tape group numbers.

The key management program 120 transmits the encrypted data encryption key and key attribute information to the management program 310 (S1204). The key attribute information contains at least a value of the key ID 11211 corresponding to the encrypted data encryption key. The encrypted data encryption key and the key attribution information may be transmitted as a key backup file 900.

The administrator obtains and stores the key backup file 900 (S1205). The administrator can obtain the key backup file 900 containing only an encryption key which the administrator needs by designating only a tape group 142 manage in Step S1201.

According to the processes of FIGS. 11 and 12, the acquisition of the key backup file 900 can be executed before the backup data is actually stored in the tape group 142. Thus, if a tape group 142 to be managed by the administrator has been set, when the administrator obtains the key backup file 900 before the tape group 142 is used (e.g., initial setting stage), the administrator does not have to obtain a key backup file 900 again thereafter as long as the encryption key is not changed.

The key backup file 900 has to be safely stored so that its illegal use or loss due to leakage can be prevented. For example, the key backup file 900 may be stored in a site different from that of the computer system of FIG. 1. The derivation password used in Step S1203 has to be safely stored by the administrator because it is necessary for decrypting the encrypted data encryption key.

As described above, the key backup process has been completed.

Figure 13:
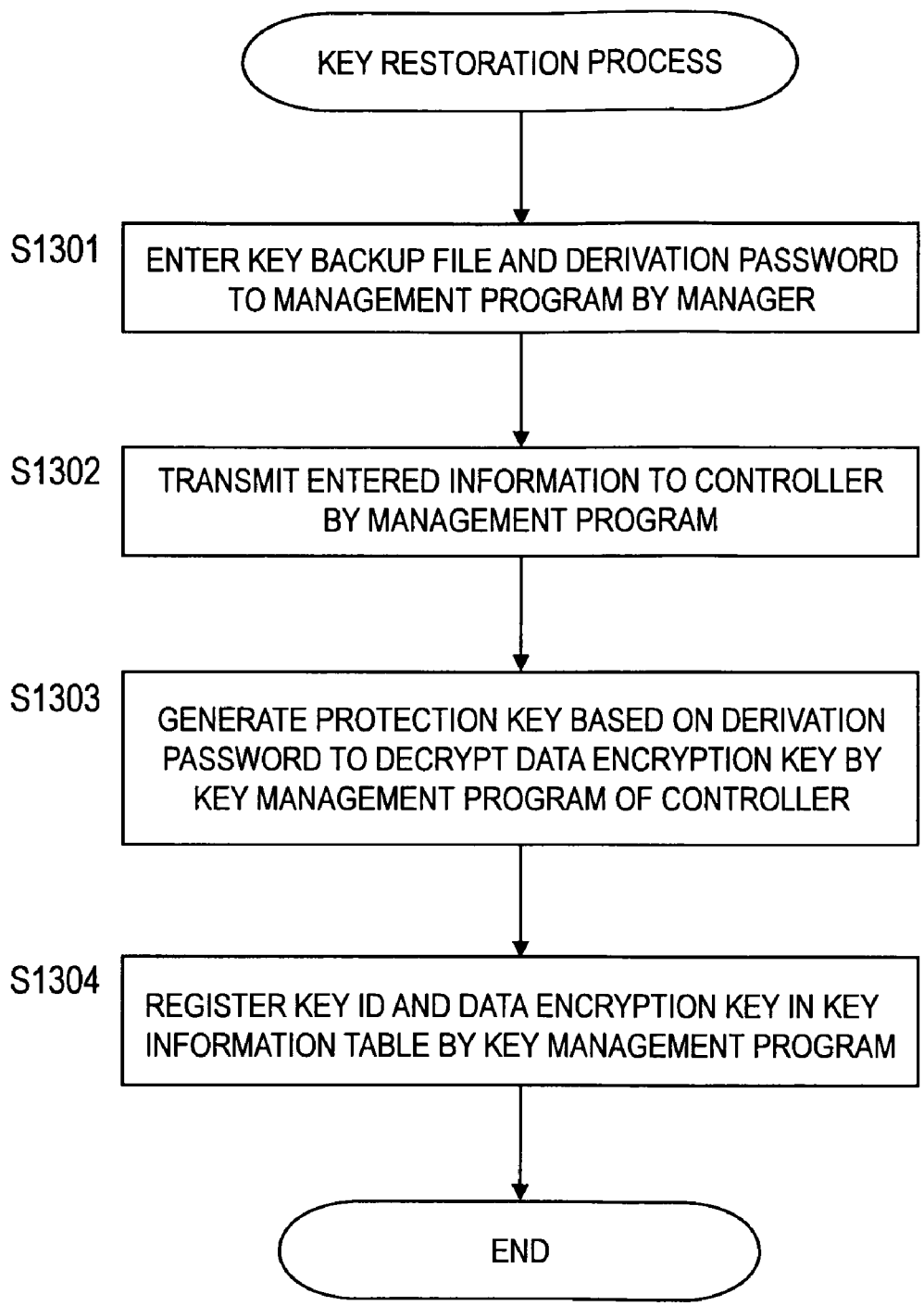
FIG. 13 is a flowchart illustrating a key restoration process according to the embodiment of this invention.

FIG. 13 is a flowchart illustrating the key restoration process according to the embodiment of this invention.

The key restoration process is carried out to restore the data encryption key in the controller 110 by using the key backup file 900.

For example, after a data encryption key is generated in the controller 110 of the storage system 101A, and data is backed up from the logical volume 140 of the storage system 101A to the tape group 142 of the storage system 101A by using the data encryption key, the data encryption key may be lost due to a hardware or software failure, or an artificial erroneous operation. Once the data encryption key is lost, even when the data backed up in the tape group 142 is read, the data cannot be decrypted to be used. In such a case, by executing the key restoration process, the data encryption key can be restored in the controller 110 of the storage system 101A.

After the data is backed up in the tape group 142 of the storage system 101A as in the aforementioned case, the tape group 142 may be taken out from the storage system 101A to be loaded in another storage system, for example, the storage system 101B. The controller 110 of the storage system 101B cannot decrypt the data to use it unless it holds the data encryption key of the tape group 142. In such a case, by executing the key restoration process, the data encryption key can be restored in the controller 110 of the storage system 101B.

After the data encryption key has been restored, the controller 110 can decrypt the data read from the tape group 142 to use it.

First, the administrator enters the key backup file 900 and the derivation password to the management program 310 (S1301).

The management program 310 transmits the entered information to the controller 110 of a restoration destination (S1302).

The key management program 120 of the controller 110 that has received the information generates a protection key based on the derivation password, and decrypts the data encryption key by using the generated protection key (S1303).

The key management program 120 registers the decrypted data encryption key and the key ID corresponding to the data encryption key in the key data 11212 and the key ID 11211 of the key information table 1121, respectively (S1304).

The key restoration process has been completed.

FIG. 14 is a flowchart illustrating the tape import process according to the embodiment of this invention.

The tape import process is carried out to register the tape stored information 1000 stored in the tape medium in the tape management table 1191. This process is executed, for example, when a tape medium constituting a tape group is inserted into the tape library device 130.

First, the tape control program 119 reads the tape stored information 1000 from the tape medium (S1401).

The tape control program 119 judges whether a TG 10001 of the read tape stored information 1000 overlaps a TG 11911 which has been registered in the tape management table 1191 (in other words, whether a value equal to the TG 10001 has been registered as a TG 11911) (Step S1402).

As described above, the controller 11 assigns a tape group number unique within a range controlled by the controller 110 to each tape group 142. However, the number is not unique in the computer system. In other words, tape groups 142 which are different from each other but to which an identical tape group number has been assigned may be present in one computer system. Accordingly, when a tape group 142 to which a tape group number has been assigned by a certain controller 110 is inserted into a tape library device 130 controlled by a controller 110 different from the controller 110, overlapping of tape group numbers may occur within a range controlled by the controller 110.

However, to enable the controller 110 to correctly control encryption and decryption of data, a tape group number has to be unique at least within a range controlled by one controller 110. Thus, when overlapping of tape group numbers is detected in Step S1402, the overlapping has to be canceled by changing the tape group numbers.

If it is judged in Step S1402 that a value equal to that of the read TG 10001 has been registered in the TG 11911, overlapping of tape group numbers to be canceled has occurred. In this case, the administrator designates a new tape group number unique at least within a range controlled by the controller 110 (S1403).

The tape control program 119 registers the read tape stored information 1000 in the tape management table 1191 (S1404). Specifically, the tape control program 119 registers values of the TG 10001, the TG unique identifier 10002, the tape 10003, the keyword 10004, and the encryption 10005 of the read tape stored information 1000 in the TG 11911, the TG unique identifier 11912, the tape 11913, the keyword 11914, and the encryption 11915 of a new line added to the tape management table 1191.

When a new tape group number is designated in Step S1403, in place of the read TG 10001, the new tape group number designated in Step S1403 is registered in the TG 11911.

On the other hand, if it is judged in Step S1402 that no value equal to that of the read TG 10001 has been registered in the TG 11911, no overlapping of tape group numbers to be canceled has occurred. In this case, Step S1403 is not executed. Accordingly, in Step S1404, the read TG 10001 is registered in the TG 11911.

Even if it is judged in Step S1402 that a value equal to that of the read TG 10001 has been registered in the TG 11911, the TG unique identifiers 10002 and 11912 respectively corresponding to the TG's 10001 and 11911 may be identical. In this case, the read TG 10001 and the TG 11911 identical to the read TG 10001 are assigned to the same tape group 142. Thus, in this case, as no overlapping of tape group numbers to be canceled has occurred, Step S1403 is not executed.

The tape control program 119 judges whether data stored in the tape group 142 corresponding to the read tape stored information 1000 (in other words, tape group 142 including a tape medium which has stored the read tape stored information 1000) has been encrypted (S1405). Specifically, the tape control program 119 judges whether a value of the encryption 10005 of the read tape stored information is "ON".

If it is judged that the data has been encrypted, the key management program 120 registers a value of the key ID 10006 of the read tape stored information 1000 in the TG key information table 1122 (S1406). Specifically, the key management program 120 adds a new line to the TG key information table 1122, and registers values of the read TG 10001 (or tape group number designated in Step S1403) and the read key ID 10006 in the tape group number 11221 and the obtained key ID 11223 of the line, respectively.

Thus, the tape import process has been completed. If it is judged in Step S1405 that the data has not been encrypted, the tape import process is finished without executing Step S1406.

FIG. 15 is a flowchart illustrating the key changing process according to the embodiment of this invention.

The key changing process is carried out to change a data encryption key.

First, the administrator selects a tape group 142, and enters an instruction to change a data encryption key for encrypting data to be stored in the tape group 142 to the management program 310 (S1501) The management program 310 transmits the entered information to the controller 110 (S1502).

The key management program 120 of the controller 110 that has received the information generates a new key ID and new key data (S1503).

The key management program 120 registers the new key ID and the new key data which have been generated in the key ID 11211 and the key data 11212 of the key information table 1121, respectively (S1504).

The key management program 120 registers the generated new key ID in the TG key information table 1122 (S1505). Specifically, the key management program 120 registers the generated new key ID in the reserved key ID 11222 corresponding to the tape group number 11221 of the tape group 142 selected in Step S1501.

Thus, the key changing process has been completed.

FIG. 16 is a flowchart illustrating the backup acquisition process according to the embodiment of this invention.

The backup acquisition process is carried out to back up data stored in the logical volume 140 in the table group 142. Alternatively, the backup acquisition process may be executed to back up data stored in a certain tape group 142 in another tape group 142.

First, the instruction program 220 issues a backup instruction (S1601). This backup instruction includes designation of one or a plurality of backup targets and keywords.

The designation of backup targets includes designation of a logical volume 140 or a tape group 142 which is a backup source (data copy source) and designation of a tape group 142 which is a backup destination (data copy destination). The keyword is used when the user retrieves the tape group 142, and subsequently registered in the keyword 11914 of the tape management table 1191. For example, the user or the administrator may designate an arbitrary backup target or an arbitrary keyword.

The copy control program 117 refers to the tape management table 1191 (S1602).

The copy control program 117 judges whether a value of the encryption 11915 corresponding to the tape group 142 designated as a backup destination is "ON" (S1603).

If it is judged that the value of the encryption 11915 is "ON", encrypted data has to be backed up in the tape group 142 designated as the backup destination. Accordingly, the copy control program 117 sets a data encryption key allocated beforehand to the designated tape group 142 in the tape drive 131 (S1604).

Specifically, the copy control program 117 refers to the TG key information table 1122 to specify a reserved key ID 11222 corresponding to the tape group 142 designated as the backup destination. The copy control program 117 refers to the key information table 1121 to set key data identified by the key ID 11211 identical to the specified reserved key ID 11222 in the tape drive 131.

In Step S1604, the copy control program 117 registers a value of the specified reserved key ID 11222 as the obtained key ID 11223 corresponding to the tape group 142 designated as the backup destination.

The copy control program 117 executes data copying for the instructed backup (S1605). Specifically, the copy control program 117 reads data from the designated backup source. Then, the copy control program 117 instructs the tape drive 131 to store the read data in the tape group 142 designated as the backup destination. The tape drive 131 encrypts the data by using the key data 11212 set in Step S1604, and stores the encrypted data in each tape 132 included in the tape group 142.

In Step S1605, the copy control program 117 further instructs the tape drive 131 to generate the tape stored information 1000, and to store the tape stored information 1000 in a tape medium.

Specifically, as a result of the copying executed in Step S1605, contents regarding the tape group 142 of the copy destination (backup destination) in the tape management table 1191 are established. The copy control program 117 reflects the established contents in the tape management table 1191. The copy control program 117 generates the tape stored information 1000 reflecting the established contents to store it in the tape medium.

As described above referring to FIG. 11, at a point of time when the TG setting process is finished, values of the TG unique identifier 11912, the tape 11913, and the keyword 11914 corresponding to the set tape group 142 are yet to be established. Subsequently, when the copying of Step S1605 is executed, those values are established to be registered in the tape management table 1191.

For example, a case where a TG#0 and "ABCD" are respectively designated as a backup destination and a keyword in Step S1601 will be described.

At a point of time before the backup acquisition process is executed, no values have been registered in the TG unique identifier 11912, the tape 11913, and the keyword 11914 corresponding to the TG#0 of the tape management table 1191.

Subsequently, the "ABCD" designated in Step S1601 is registered in the keyword 11914.

If "AAAAAAAA" is set as a unique identifier of the TG#0 as a result of the copying executed in Step S1605, the "AAAAAAAA" is registered in the TG unique identifier 11912.

If data of the logical volume 140 of the copy source is stored in three tapes 132 identified by tape numbers "1001", "1002", and "1003" as a result of the copying executed in Step S1605, "1001", "1002", and "1003" are registered in the tape 11913.

In this case, in the TG 10001, the TG unique identifier 10002, the tape 10003, the keyword 10004, and the encryption 10005 of the tape stored information 1000 generated in Step S1605, values equal to those of the TG 11911, the TG unique identifier 11912, the tape 11913, and the keyword 11914, and the encryption 11915 corresponding to the TG#0 are set. Based on the TG key information table 1122, a value "aaaaaaaa" of the obtained key ID 11223 corresponding to the TG#0 is set in the key ID 10006.

However, because data to be backed up is generally compressed as described above, how many tapes 132 one tape group includes after all is uncertain until the end of the copying executed in Step S1605.

For example, when the three tapes 132 identified by the tape numbers "1001", "1002", and "1003" store data to be backed up in order of the tape numbers, at a point of time when storage of data in the tape 132 identified by the tape number "1001" is finished, which tape 132 stores the remaining data is unknown.

Thus, for example, no information is registered in the tape 10003 of the tape stored information 1000 stored in tape media of the tapes 132 identified by the tape numbers "1001" and "1002", while "1001", "1002", and "1003" may be stored only in the tape 10003 of the tape stored information 1000 stored in a tape medium of the tape 132 which is a last tape when the copying is finished and is identified by the tape number "1003".

On the other hand, if it is judged in Step S1603 that the value of the encryption 11915 is "OFF", the data to be backed up in the tape group 142 designated as the backup destination does not have to be encrypted. Accordingly, the copy control program 117 sets encryption "OFF" (in other words, information indicating that no encryption is executed) in the tape drive 131 (S1606).

The copy control program 117 executes the instructed backup (S1607). The process executed in Step S1607 is similar to that executed in Step S1605. However, because the data does not have to be encrypted, the tape drive 131 stores the data in each tape 132 without encrypting the data.

After Step S1605 or S1607 is executed, the tape control program 119 registers the designated keyword in the keyword 11914 corresponding to the tape group 142 designated as the backup destination in the tape management table 1191. Further, the tape control program 119 registers the TG unique identifier and the tape number which have been set in the TG unique identifier 11912 and the tape 11913 of the tape management table 1191, respectively (S1608).

Then, the copy control program 117 judges whether the backup has been finished for all the designated tape groups 142 (S1609).

If the backup has not been finished for all the tape groups 142, the process returns to Step S1602 to execute backup for the remaining tape groups 142.

If the backup has been finished for all the tape groups 142, the backup acquisition process is finished.

FIG. 17 is a flowchart illustrating the restoration process from a tape according to the embodiment of this invention.

The restoration process from the tape is carried out to restore data stored in the tape group 142 in the logical volume 140 (or another tape group 142).

First, the instruction program 220 issues a restoration instruction (S1701). This restoration instruction includes designation of one or a plurality of restoration targets or a keyword.

The designation of restoration targets includes destination of a tape group 142 which is a restoration source (in other words, data copy source) and destination of a logical volume 140 or a tape group 142 which is a restoration destination (in other words, data copy destination). The keyword is used when the user retrieves a tape group 142 as in the case of the keyword shown in FIG. 16.

When the keyword is designated, the tape control program 119 of the controller 110 refers to the tape management table 1191 to designate a tape group 142 corresponding to the keyword 11914 identical to the designated keyword and a tape 132 included in the tape group 142 as restoration sources (in other words, data copy sources) (S1702).

The copy control program 117 refers to the tape management table 1191 to judge whether a value of the encryption 11915 corresponding to the tape group 142 designated as the restoration source is "ON" (S1703).

If the value of the encryption 11915 is judged to be "ON", encrypted data has been stored in the tape group 142 designated as the restoration source. In other words, data read from the tape group 142 has to be decrypted. Accordingly, the copy control program 117 sets a data encryption key in the tape drive 131 (S1704).

Specifically, the copy control program 117 refers to the TG key information table 1122 to specify a corresponding obtained key ID 11223 corresponding to the tape group 142 designated as the backup destination. The copy control program 117 refers to the key information table 1121 to set key data 11212 identified by a key ID 11211 identical to the specified obtained key ID 11223 in the tape drive 131.

The copy control program 117 executes data copying for the instructed restoration (S1705). Specifically, first, the tape library device 130 loads a tape 132 included in the designated tape group 142 in the tape drive 131 according to an instruction from the copy control program 117. The tape drive 131 reads data from the loaded tape, and decrypts the read data by using the set key data 11212. The copy control program 117 copies the decrypted data to the restoration source.

On the other hand, if it is judged in Step S1703 that the value of the encryption 11915 is "OFF", unencrypted data has been stored in the tape group 142 designated as the restoration source. In other words, the data read from the tape group 142 does not have to be decrypted. In this case, the copy control program 117 executes data copying for the instructed restoration (S1706).

The process executed in Step S1706 is similar to that executed in Step S1705. However, because the stored data has not been encrypted, the tape drive 131 does not decrypt the data.

The copy control program 117 judges whether the restoration has been finished for all the designated tape groups 142 (S1708).

If the restoration has not been finished for all the tape groups 142, the process returns to Step S1702 to execute restoration of the remaining tape groups 142.

If the restoration has been finished for all the tape groups 142, the restoration process from the tape is finished.

According to the embodiment of this invention, by allocating an encryption key for each tape group which is a logical management unit, the number of used encryption keys can be limited to a minimum. According to this embodiment, an encryption key can be allocated beforehand to a tape group to which no tape has actually been allocated. Thus, if the administrator saves a backup file of an encryption key of a tape group which he has to manage at the time of initial setting, does not have to obtain a backup file of the encryption key again thereafter, as long as the encryption key is not changed.

Further, a conventional key management server or the like has to be maintained secure because it handles an unencrypted encryption key. Accordingly, the conventional key management server or the like has to include special hardware for maintaining the encryption key secure, which incurs an increase in cost. According to this embodiment, however, the backup file of the encryption key is encrypted by the protection key. Thus, because the backup file of the encryption key does not have to be stored in an expensive key management server, the key can be safely managed at low costs.

While the present invention has been described in detail and pictorially in the accompanying drawings, the present invention is not limited to such detail but covers various obvious modifications and equivalent arrangements, which fall within the purview of the appended claims.

What is claimed is:

1. A storage system, comprising:
a disk storage device;
a tape storage device in which a tape storage medium can be loaded; and
a controller for controlling the disk storage device and the tape storage device, wherein:
the controller includes a first interface coupled to a network, at least a second interface coupled to the disk storage device and the tape storage device, a processor coupled to the first interface and the second interface, and a memory coupled to the processor; and
the controller is configured to:
generate, upon reception of a request for setting a tape group including one or more tape storage media, a first encryption key used for encrypting data to be stored in the tape group set by the request; and
hold information for correlating the generated first encryption key with the tape group, and
wherein the tape group includes a plurality of the tape storage media, and
wherein the controller is configured to:
control, upon reception of a request for backing up data stored in the disk storage device in the tape group, the tape storage device to encrypt the data stored in the disk storage device by using the first encryption key correlated with the tape group;
control the tape storage device to store the encrypted data, information for identifying the tape group, and information for identifying the first encryption key in the plurality of tape storage media included in the tape group;
control, upon reception of a request for restoring the data stored in the tape group in the disk storage device, the tape storage device to read data from the plurality of tape storage media included in the tape group;
control the tape storage device to decrypt the read data by using the first encryption key correlated with the tape group;
store the decrypted data in the disk storage device;
receive a request for backing up the first encryption key and a password;
generate a second encryption key based on the password;
encrypt the first encryption key by using the second encryption key; and
output the encrypted first encryption key.

2. The storage system according to claim 1, wherein the controller is configured to:
generate, upon reception of a request for changing the first encryption key, a new encryption key as the first encryption key; and
hold information for correlating the generated new first encryption key with the tape group.

3. A computer system comprising:
a first storage system, a management terminal coupled to the first storage system, and a second storage system coupled to the management terminal, wherein:
the first storage system comprises a first disk storage device, a first tape storage device in which a tape storage medium can be loaded, and a first controller for controlling the first disk storage device and the first tape storage device;
the first controller comprises a first interface coupled to a network, at least a second interface coupled to the first disk storage device and the first tape storage device, a first processor coupled to the first interface and the second interface, and a first memory coupled to the first processor;
the second storage system comprises a second disk storage device, a second tape storage device, and a second controller for controlling the second disk storage device and the second tape storage device;
the second controller comprises a third interface coupled to the network, at least a fourth interface coupled to the second disk storage device and the second tape storage device, a second processor coupled to the third interface and the fourth interface, and a second memory coupled to the second processor; and
the first storage system is configured to:
generate, upon reception of a request for setting a tape group including one or more first tape storage media, a first encryption key used for encrypting data to be stored in the tape group set by the request;
hold information for correlating the generated first encryption key with the tape group;
receive a request for backing up the first encryption key and a password from the management terminal;
generate a second encryption key based on the password;
encrypt the first encryption key by using the second encryption key; and
transmit the encrypted first encryption key to the management terminal, and
the second storage system is configured to:
generate, upon reception of a request for restoring the first encryption key, the encrypted first encryption key, and the password from the management terminal, the second encryption key based on the password;
decrypt the encrypted first encryption key by using the second encryption key; and
hold the decrypted first encryption key.

4. The computer system according to claim 3, wherein:
the tape group includes a plurality of the first tape storage media; and
the first storage system is configured to:
encrypt, upon reception of a request for backing up data stored in the first disk storage device in the tape group, the data stored in the first disk storage device by using the first encryption key correlated with the tape group; and store the encrypted data, information for identifying the tape group, and information for identifying the first encryption key in the plurality of first tape storage media included in the tape group.

5. The computer system according to claim 4, wherein the second storage system is configured to:
read the information for identifying the tape group and the information for identifying the first encryption key from the plurality of first tape storage media included in the tape group; and
hold information for correlating the first encryption key with the tape group based on the read information.

6. The computer system according to claim 5, wherein the second storage system is configured to:
read, upon reception of a request for restoring the data stored in the tape group in the second disk storage device, data from the plurality of first tape storage media included in the tape group;
decrypt the read data by using the first encryption key correlated with the tape group; and
store the decrypted data in the second disk storage device.

7. The computer system according to claim 3, wherein the first storage system is configured to:
generate, upon reception of a request for changing the first encryption key, a new encryption key as the first encryption key; and
hold information for correlating the generated new first encryption key with the tape group.

8. A method of controlling a computer system comprising a first storage system, a management terminal coupled to the first storage system, and a second storage system coupled to the management terminal, the first storage system comprising a first disk storage device, a first tape storage device in which a tape storage medium can be loaded, and a first controller for controlling the first disk storage device and the first tape storage device, the first controller comprising a first interface coupled to a network, at least a second interface coupled to the first disk storage device and the first tape storage device, a first processor coupled to the first interface and the second interface, and a first memory coupled to the first processor, the second storage system comprising a second disk storage device, a second tape storage device, and a second controller for controlling the second disk storage device and the second tape storage device, the second controller comprises a third interface coupled to the network, at least a fourth interface coupled to the second disk storage device and the second tape storage device, a second processor coupled to the third interface and the fourth interface, and a second memory coupled to the second processor, the method comprising the steps of:
generating, upon reception of a request for setting a tape group including one or more tape storage media, by the first storage system, a first encryption key used for encrypting data to be stored in the tape group set by the request;
holding, by the first storage system, information for correlating the generated first encryption key with the tape group;
receiving, by the first storage system, a request for backing up the first encryption key and a password from the management terminal;
generating, by the first storage system, a second encryption key based on the password;
encrypting, by the first storage system, the first encryption key by using the second encryption key;
transmitting, by the first storage system, the encrypted first encryption key to the management terminal;
generating, upon reception of a request for restoring the first encryption key, the encrypted first encryption key, and the password from the management terminal, by the second storage system, the second encryption key based on the password;
decrypting, by the second storage system, the encrypted first encryption key by using the second encryption key; and
holding, by the second storage system, the decrypted first encryption key.

9. The method according to claim 8, wherein:
the tape group includes a plurality of the first tape storage media; and
the method further comprising the steps of:
encrypting, upon reception of a request for backing up data stored in the first disk storage device in the tape group, by the first storage system, the data stored in the first disk storage device by using the first encryption key correlated with the tape group; and
storing, by the first storage system, the encrypted data, information for identifying the tape group, and information for identifying the first encryption key in the plurality of first tape storage media included in the tape group.

10. The method according to claim 9, further comprising the steps of:
reading, by the second storage system, the information for identifying the tape group and the information for identifying the first encryption key from the plurality of first tape storage media included in the tape group; and
holding, by the second storage system, information for correlating the first encryption key with the tape group based on the read information.

11. The method according to claim 10, further comprising the steps of:
reading, upon reception of a request for restoring the data stored in the tape group in the second disk storage device, by the second storage system, data from the plurality of first tape storage media included in the tape group;
decrypting, by the second storage system, the read data by using the first encryption key correlated with the tape group; and
storing, by the second storage system, the decrypted data in the second disk storage device.

12. The method according to claim 8, further comprising the steps of:
generating, upon reception of a request for changing the first encryption key, by the first storage system, a new encryption key as the first encryption key; and
holding, by the first storage system, information for correlating the generated new first encryption key with the tape group.

* * * * *